Figure 4:
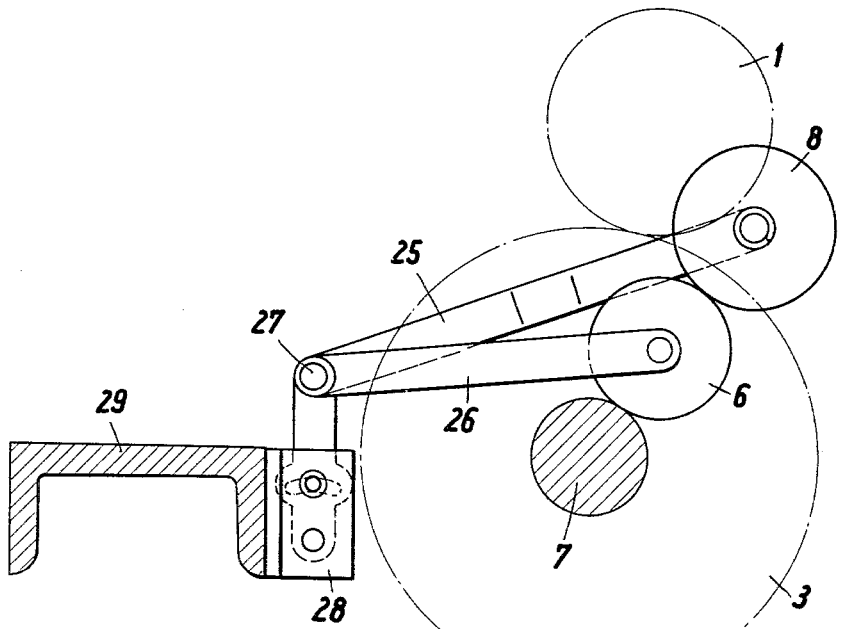

March 1, 1966
G. FRANZEN
3,237,876
ATTACHMENT FOR BOBBIN WINDING EQUIPMENT
Filed April 29, 1963
6 Sheets-Sheet 1
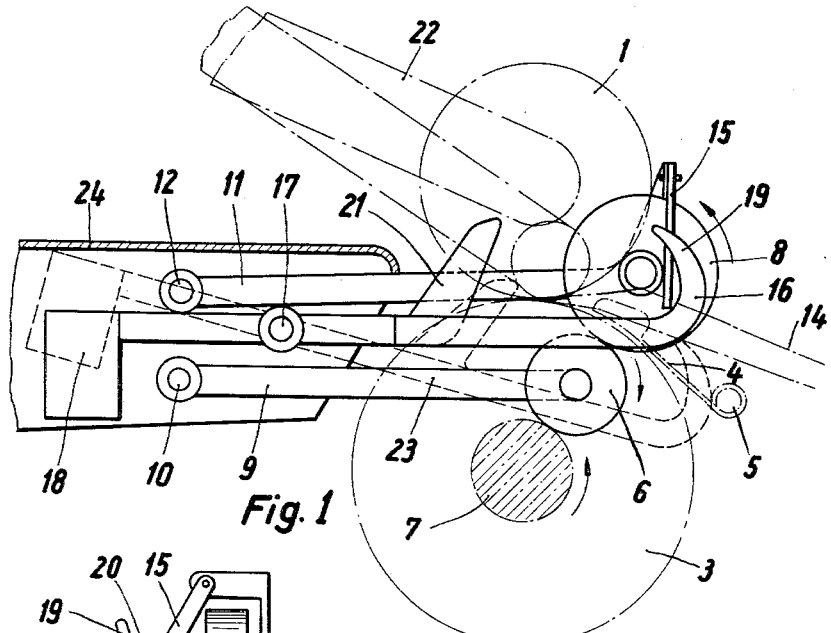
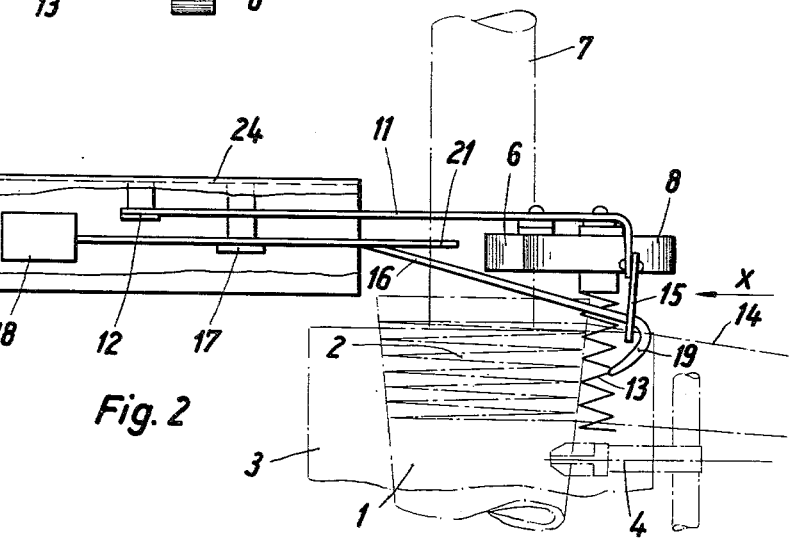
Inventor:
Gustav Franzen
By Cushman Darby & Cushman
Attorneys March 1, 1966  G. FRANZEN  3,237,876
ATTACHMENT FOR BOBBIN WINDING EQUIPMENT
Filed April 29, 1963  6 Sheets-Sheet 3

Inventor:
Gustav Franzen
By Cushman, Darby & Cushman
Attorneys

March 1, 1966 G. FRANZEN 3,237,876
ATTACHMENT FOR BOBBIN WINDING EQUIPMENT
Filed April 29, 1963 6 Sheets-Sheet 4

Inventor:
Gustav Franzen
By Cushman, Darby & Cushman
Attorneys

March 1, 1966  G. FRANZEN  3,237,876
ATTACHMENT FOR BOBBIN WINDING EQUIPMENT
Filed April 29, 1963  6 Sheets-Sheet 6

Inventor:
Gustav Franzen
By Cushman, Darby & Cushman
Attorneys

United States Patent Office 3,237,876
Patented Mar. 1, 1966

3,237,876
ATTACHMENT FOR BOBBIN WINDING
EQUIPMENT
Gustav Franzen, Neersen, Germany, assignor to Volkmann & Co., Krefeld, Germany, a partnership
Filed Apr. 29, 1963, Ser. No. 276,538
Claims priority, application Germany, May 2, 1962,
V 22,436; Feb. 4, 1963, V 23,601
2 Claims. (Cl. 242—18)

The present invention relates to attachment for bobbin winding equipment.

When winding bobbins it is desirable to provide a reserve length of thread. The purpose of this reserve length of thread is to permit the ends of the thread on different bobbins to be joined. The bobbins are mounted in looms, creels or like textile machines for continuous work. The reserve length of thread may also serve to provide a few turns of thread which for some reason or another must be removed before the bobbins are put to further use. It has hitherto been the practice to apply a few layers of thread by hand to form this reserve. This is inconvenient and wasteful of time. Moreover, the application of thread to the tube by hand is not a precise operation. It is also known to provide registers against which the operative should hold the thread whilst winding on the reserve layers of thread. The drawback of this arrangement is that it leaves to the discretion of the operative how much thread is run on to the tube.

The object of the invention is to provide an attachment for bobbin winding frames equipped with individual thread guides or grooved winding rollers for winding a reserve length of thread on to one projecting end of the core or tube upon which the bobbin is to be wound, the attachment being such that it is no longer left to the operative to decide how much thread should be wound on as a reserve, the process of winding on the reserve length of thread and the initiation of the normal winding operation being made automatic.

These ends are achieved by providing a rotatably driven thread guiding attachment in the form of a coiled wire. This thread guiding attachment is located in proximity with one end of the winding tube for guiding the running thread until it is transferred to the thread guide or to the grooves of the grooved roller. The thread guiding attachment is conveniently located to rotate in axial parallelism with the tube. To this end the thread guiding attachment may be mounted on the hub of a wheel which may be driven from the main drive shaft through an intermediate wheel.

Alternatively, the thread guiding attachment may be arranged to rotate in a position other than axially parallel with the tube, for instance in an upright position.

The coils of the thread guiding attachment ensure that the desired reserve length of thread is wound on to the end of the tube in the desired way without any assistance on the part of the operative being required. Moreover, if the pitch of the coils of the attachment is arranged to be different along the length of the wire, different amounts of thread can be easily wound on as a reserve according to the purpose the said reserve is intended subsequently to fulfill.

Furthermore, a register element may be provided which can be selectably set to any particular turn of the coiled wire attachment. This arrangement deprives the operative of the possibility of inserting the wire into any turn of his own choosing. The length of the thread reserve will thus always be exactly the same.

In order to ensure that the operative cannot err a supplementary deflectable lever may be provided for co-operation with the register and for forming a positive lead-in for insertion of the thread into a particular turn of the coil.

The attachment proposed by the present invention permits reserve lengths of thread to be wound on to the tube ends of bobbins without additional manipulations or particular care being required of the machine minder.

In a further development of the inventive idea it is proposed to mount the intermediate wheel which makes contact with the drive shaft as well as the wheel to which the thread guiding attachment is secured on levers which may be fulcrumed on a common pivot. The bracket supporting this pivot may be so contrived that it can be located for co-operation with either end of the tube without dismounting the levers from their pivot. This feature provides a further simplification of the manner in which the thread guiding attachment is held and the bracket supporting the levers can be universally adapted for location in the most suitable position for any particular case.

The proposed device may be further modified in that the wheel carrying the thread guiding attachment is directly driven by frictional engagement of the turntable of the bobbin frame. The wheel may be mounted on a lever fulcrumed either on the bobbin frame or on the machine frame. The advantage of this arrangement is that an intermediate wheel is no longer required. Such a wheel can also be saved by driving the wheel carrying the thread guiding attachment by direct contact with the friction roller or grooved winding roller. Sometimes it may be advisable for reasons of space not to use friction wheels but rather to drive the thread guiding attachment through a flexible shaft. The simplest arrangement in such a case is to derive rotation from the shaft of the turntable of the bobbin.

In every case it has been found useful to shape the hub of the wheel carrying the thread guiding attachment in such a way that it will directly cause the thread to slip into the rotating attachment. A suitable shape would be a coned and/or similar curved contour.

Figure 5:
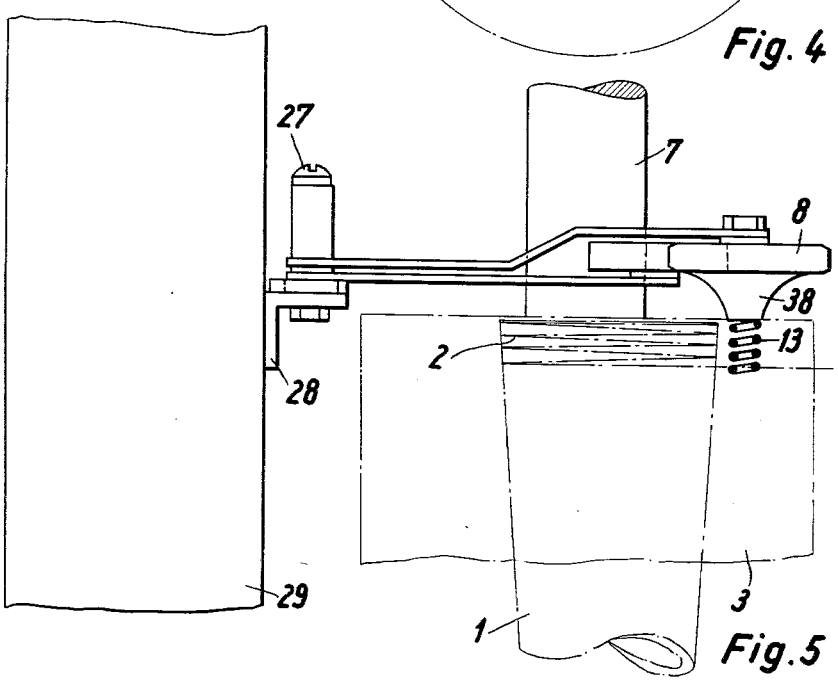
Figure 6:
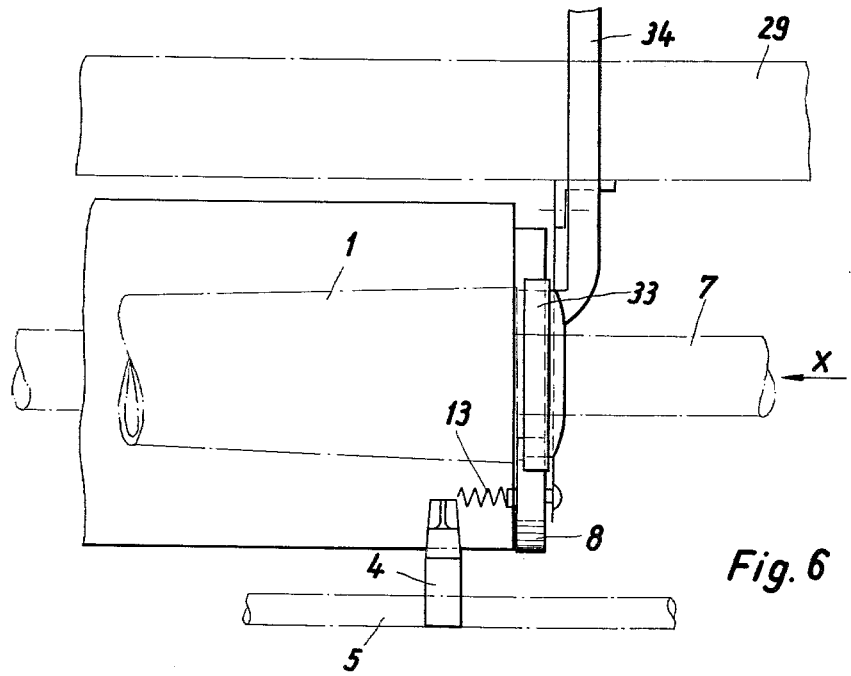
Figure 7:
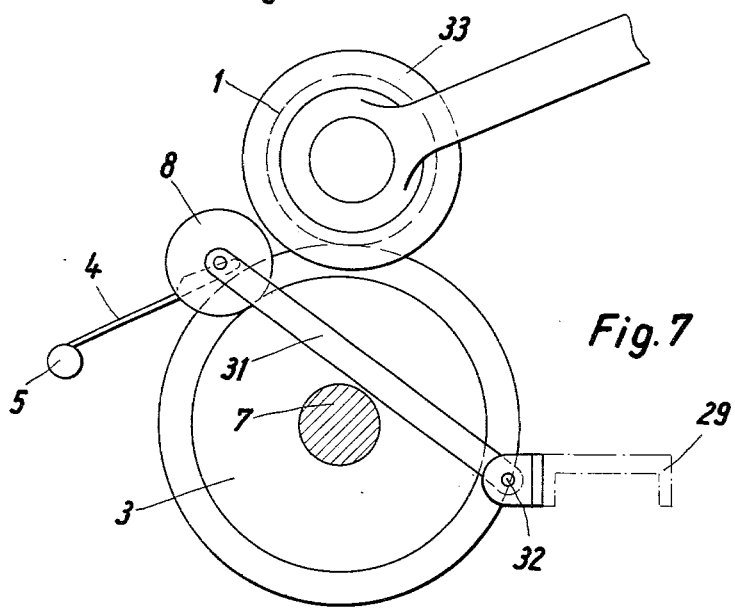
Figure 8:
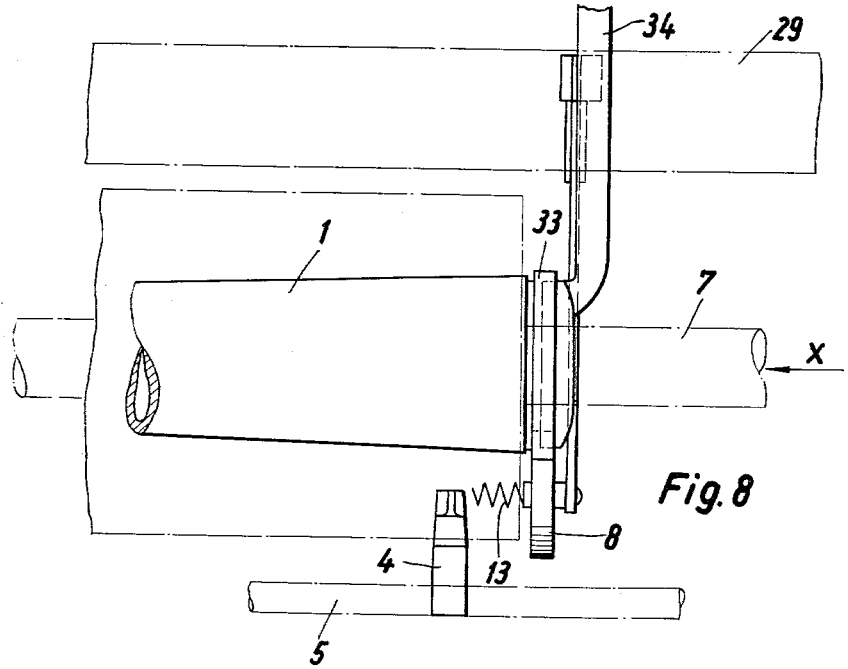
Figure 9:
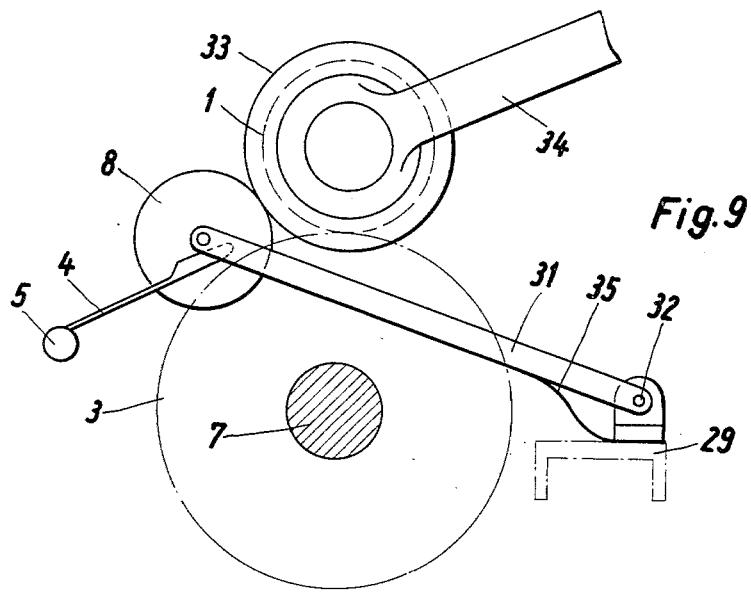
Figure 10:
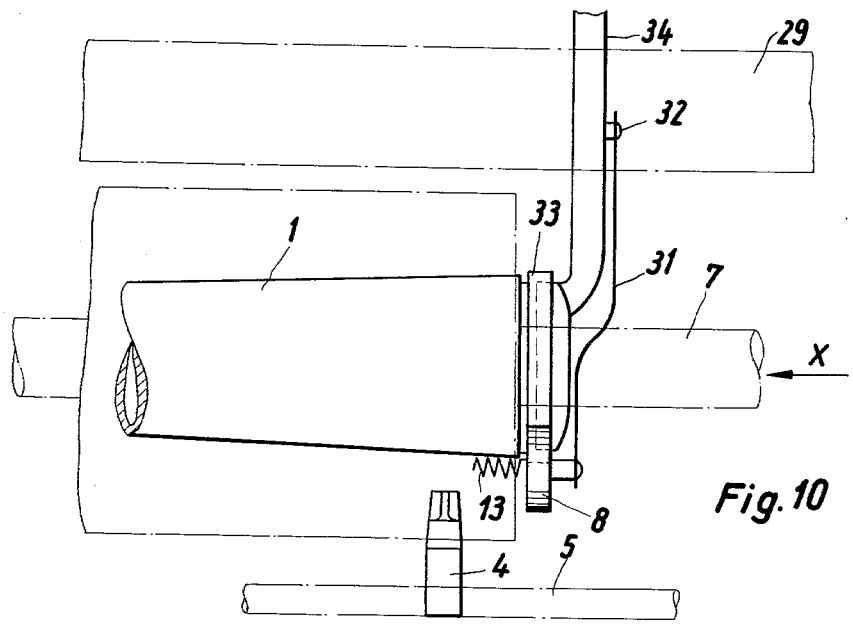
Figure 11:
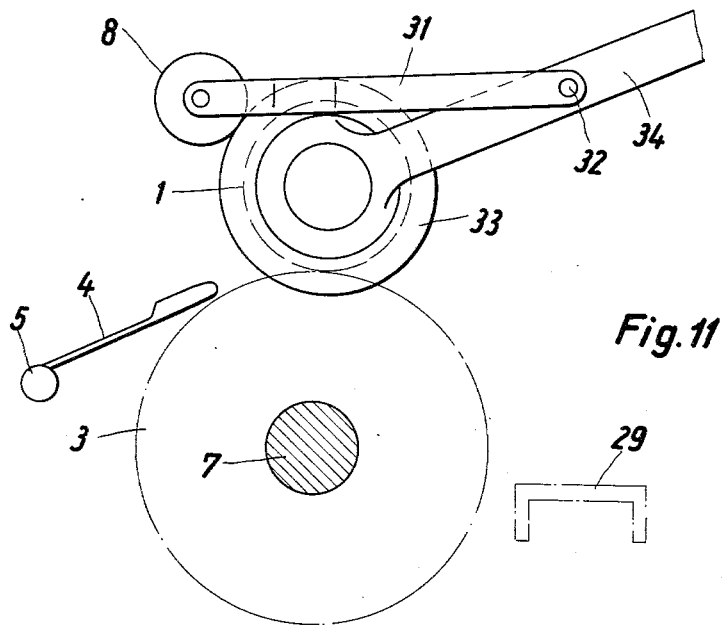
Figure 12:
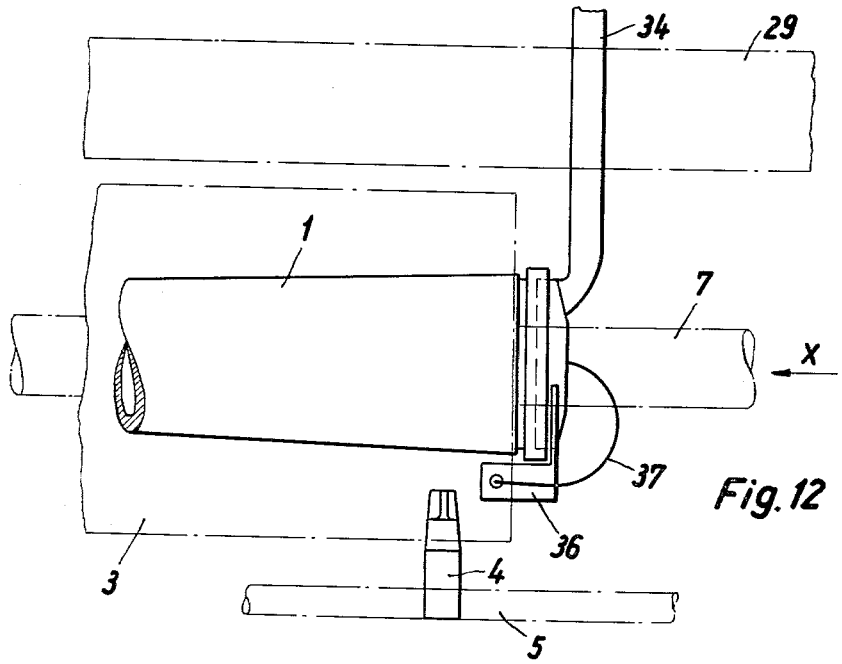
Figure 13:
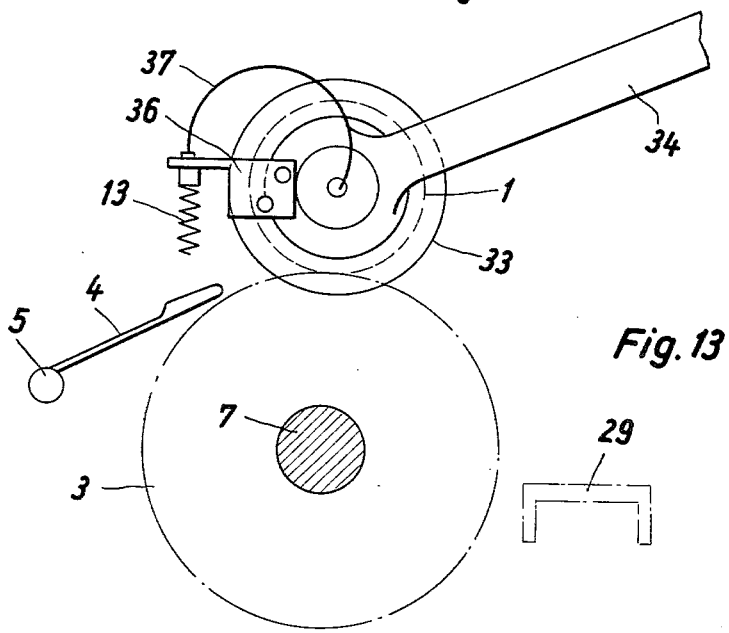

Preferred embodiments of the invention are illustratively shown in the drawings in which FIG. 1 is an elevational view of one form of construction, FIG. 2 is a plan view of FIG. 1, FIG. 3 is fragmentary view of a part seen in FIG. 2 when viewed in the direction of arrow X, FIG. 4 is a side elevation of a different form of construction, FIG. 5 is a plan view of FIG. 4, FIG. 6 is a plan view of a further embodiment of the invention, FIG. 7 is an elevational view in the direction of arrow X in FIG. 6, FIG. 8 is a plan view of another embodiment of the invention, FIG. 9 is an elevational view in the direction of arrow X in FIG. 8, FIG. 10 is a plan view of yet another embodiment of the invention, FIG. 11 is an elevational view in the direction of arrow X in FIG. 10, FIG. 12 is a plan view of a final embodiment of the invention, and FIG. 13 is an elevational view in the direction of arrow X in FIG. 12.

In these drawings like reference numerals identify like or corresponding parts.

It is desired after previous application of a reserve length 2 of thread to wind a thread on to a winding core, viz., tube 1, in conventional manner. Packages which are built up on such tubes are driven by a so-called friction roller 3. The friction roller may simultaneously operate as a rotating thread guide and replace the traversing thread guide 4 which is provided in the illustrated example. The thread guide 4 is mounted on the traversing rail 5.

In order to provide a reserve length 2 of thread it has in the past been the practice for the machine operative to apply the thread to the tube 1 by hand and to guide it on to the tube by hand until the reserve length of thread appeared to be sufficient.

In order to restrict the operative's discretion the invention provides a special device to do this particular work. This consists of an intermediate wheel 6 frictionally driven by the shaft 7 of friction roller 3 and itself driving a wheel 8 in the arrowed direction. Wheel 6 is mounted on the end of a deflectable lever 9 fulcrumed at 10, whereas wheel 8 is mounted on the end of a deflectable lever 11 fulcrumed at 12.

Affixed to the hub of wheel 8 is the coiled thread guiding attachment which in the present instance consists of a helically coiled wire 13. If a thread, for instance the thread indicated at 14, is placed into one of the turns of the thread guiding attachment 13 it will be applied to the spool in closely spaced convolutions until it drops out of the coil at the end of the thread guiding attachment 13 where it reaches the conventional traversing thread guide 4 which winds on the thread in the normal manner.

As such, the device which has been described would already be able to function. The operative would merely be instructed into which of the turns of the wire coil the thread should be inserted.

However, since this still gives opportunities for making mistakes it is preferred to provide a supplementary register member 15. The end of this register member can be optionally set to register with any turn of the thread guiding attachment 13.

Nevertheless, by reference to FIG. 3, the operative could still err by inserting the thread too far to the left. In order to obviate this possibility a swivel lever 16 is provided, fulcrumed in the casing at 17 and loaded by a balancing weight at 18. The forward end of this lever, as shown at 19, has a horn-shaped hook. This hook 19 is adapted temporarily to define a positive lead-in 20 for the thread in conjunction with register member 15. This positive lead-in ceases to operate as soon as the winding frame is tipped down to apply tube 1 to the friction wheel 3. To this end lever 16 is provided with a rest 21 which makes contact with the arm 22 of a winding frame not shown in the drawing whereby it is pushed into the position indicated by chain lines 23.

The pivots 10, 12 and 17 of the levers 9, 11 and 16 are located in a casing 24 secured to the main frame of the machine. Preferably this casing should be substantially closed to prevent the pivot bearings from being fouled and impairing the functioning of the device.

In the illustrated embodiment the helically coiled wire has 13 turns of constant pitch. Consequently the reserve length of thread will be evenly wound. However, if desired the pitch may be variable for winding the thread in wider or narrower turns to form the reserve.

It is also assumed in the illustrated embodiment that there is a reduction ratio of 1:2 from shaft 7 to wheel 8. This ratio can be varied in accordance with the desired length of the reserve. To this end use may be made for instance of a cone friction drive which permits every winding station to be controlled from a central point. Moreover, a variation of the reserve length of thread can be achieved for instance by not deriving the drive from shaft 7 but from a shaft of continuously variable speed. Furthermore the nature of the wound reserve length of thread can be selectably varied by exchanging the coiled thread guiding attachment 13 for a different attachment.

In the embodiments according to FIGS. 4 to 13 tube 1 is likewise intended to be provided with a reserve length 2 of thread, likewise in a manner depriving the operative of discretion. The tube or the package which builds up on the same is driven by a friction wheel 3 which may be a grooved roller. If a grooved roller is not provided a traversing thread guide is used which is not shown in the drawing to avoid complication.

The helically coiled thread guiding attachment 13 is fitted to wheel 8 which derives its drive from shaft 7 of the friction roller 3 through an intermediate wheel 6. The intermediate wheel 6 which bears on the drive shaft 7 and the wheel 8 to which the thread guiding attachment 13 is affixed are mounted on the ends of levers 25 and 26 respectively which have a common fulcrum at 27. This common pivot 27 is mounted on a bracket 28 which is directly attached to a part 29 of the machine frame. The pivot mount 27 can be attached in different ways to the bracket 28 and the bracket can be easily affixed in different places to serve one or the other end of the tube 1. In other words, the arrangement illustarted in FIGS. 4 and 5 is universally adaptable to any set of circumstances which may present themselves in the construction of winding or twist frames.

In the embodiment illustrated in FIGS. 6 and 7 which comprises a traversing thread guide 4 on a traversing rail 5, wheel 8 to which the thread guiding attachment is secured is directly driven by the friction roller 3. This arrangement has the advantage of eliminating the intermediate wheel required in the embodiment in FIGS. 4 and 5, a modification which may occasionally be useful for reasons of space. Wheel 8 is mounted on a lever 31 which is fulcrumed at 32 on a bracket secured to a part 29 of the machine frame. If a grooved roller is used instead of a traversing thread guide 4 the general arrangement will be the same excepting that the friction roller 3 will be replaced by a grooved roller. FIGS. 6 and 7 also shows the disc or turntable 33 of tube 1 which is rotatably mounted in frame 34 in a manner that is well understood.

The embodiment according to FIGS. 8 and 9 is basically similar to that shown in FIGS. 6 and 7 from which it differs in that wheel 8 is driven from the turntable 33 of tube 1. In order to ensure frictional engagement between the wheel and the rim of the turntable 33 the supporting lever 31 must be loaded by a spring 35.

Whereas in the embodiment illustrated in FIGS. 8 and 9 lever 31 and pivot 32 are secured to a part 29 of the machine frame, the otherwise identical form of construction according to FIGS. 10 and 11 comprises an arrangement in which this lever 31 is deflectably mounted on a pivot 32 on arm 34.

In the further embodiment according to FIGS. 12 and 13 the revolving thread guiding attachment 13 is held in an upright position. To this end frame 34 carries a member 36 in which the thread guiding attachment 13 is rotatably mounted. The attachment is driven by a flexible shaft 37 from the shaft of turntable 33. This is a particularly compact arrangement comprising few parts.

The insertion of the thread into the revolving attachment 13 may be effected either directly by hand or means may be provided which automatically insert the thread into the attachment. A suitable contrivance is shown in FIG. 5 at 38. The hub of wheel 8 is coned or has a curved contour. This shape of the hub positively causes the thread to slip into the attachment 13.

What I claim is:

1. In a bobbin winding frame for winding a package on a core and comprising a roller for driving the said core and the package built-up thereon and means for guiding the thread, a device for winding a reserve length of thread on a projecting end of said core comprising a rotatable thread guiding means in the region of one end of the core, said rotatable thread guiding means being in the form of a wire coil to receive the thread in a convolution of the coil; means to rotate said coil about its axis to displace the thread along the coil until it is released to said first mentioned thread guide means; said means to rotate the coil comprising a rotary member carrying the said coil, a drive shaft for the said roller and an intermediate rotary member between said shaft and the said rotary member carrying the coil, said intermediate rotary member bearing on the said shaft and on the said rotary member carrying the coil, the said rotary members being mounted on different levers which pivot about a common fulcrum.

2. A device according to claim 1, comprising a bracket to which the said levers are pivoted, said bracket being displaceable with the said levers to enable the coil to serve either end of the core.

References Cited by the Examiner

UNITED STATES PATENTS

| | | | |
|---|---|---|---|
| 2,096,316 | 10/1937 | Beran | 242—18 |
| 2,715,308 | 8/1955 | Soussloff et al. | |
| 3,065,921 | 11/1962 | Furst | 242—18 |

FOREIGN PATENTS

| | | |
|---|---|---|
| 1,128,873 | 8/1956 | France. |

MERVIN STEIN, *Primary Examiner.*

RUSSELL C. MADER, S. N. GILREATH,
*Assistant Examiners.*